A. E. MOON.
METHOD AND APPARATUS FOR MAKING ENDLESS BELTS OR RINGS
APPLICATION FILED DEC. 19, 1921.
1,420,727. Patented June 27, 1922.
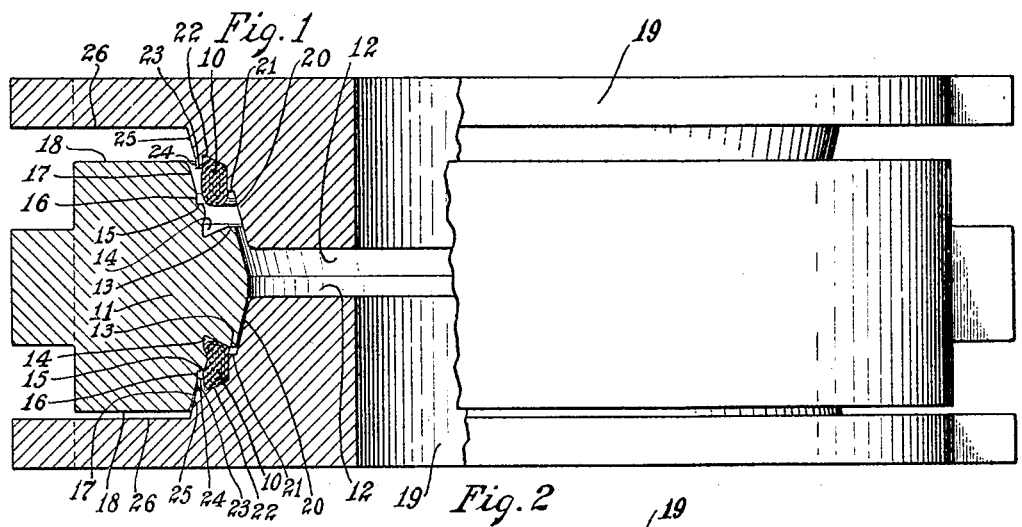
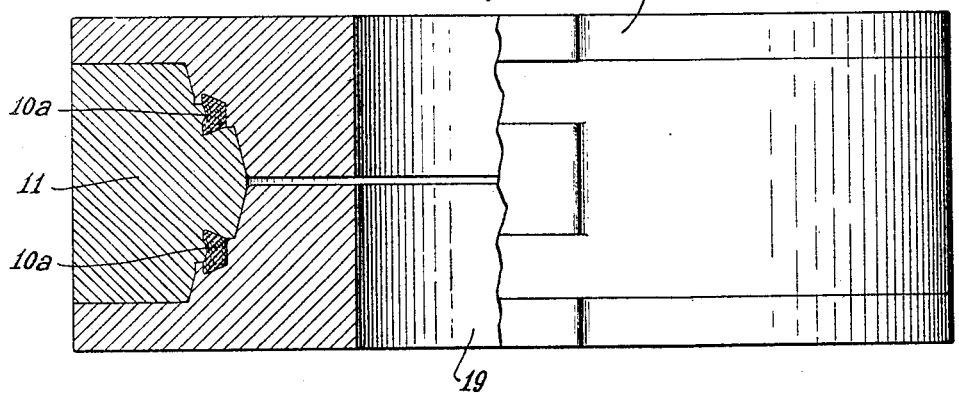
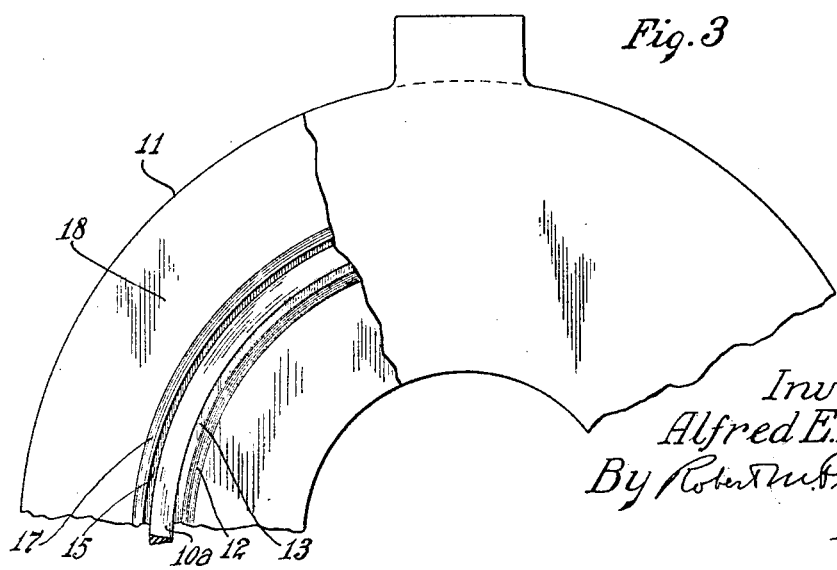
Inventor
Alfred E. Moon
By Robert M. Pierson
Atty.

UNITED STATES PATENT OFFICE.

ALFRED E. MOON, OF AKRON, OHIO, ASSIGNOR TO THE B. F. GOODRICH COMPANY, OF NEW YORK, N. Y., A CORPORATION OF NEW YORK.

METHOD AND APPARATUS FOR MAKING ENDLESS BELTS OR RINGS.

1,420,727.   Specification of Letters Patent.   Patented June 27, 1922.

Application filed December 19, 1921. Serial No. 523,367.

*To all whom it may concern:*

Be it known that I, ALFRED E. MOON, a citizen of the United States, residing at Akron, in the county of Summit and State of Ohio, have invented a certain new and useful Method and Apparatus for Making Endless Belts or Rings, of which the following is a specification.

This invention relates to the art of making endless belts or rings and is especially applicable to the making of power-transmission belts composed of fibrous material and a binding material such as rubber.

My object is to provide convenient and economical means for producing a comparatively stretchless belt or ring of exact form and size, and more particularly to provide an improved method and apparatus for molding and vulcanizing an annular rubber and fiber article under circumferential tension, and to produce an improved article.

Of the accompanying drawings:

Fig. 1 is a side elevation, with parts in section, of a partly open mold embodying and adapted to carry out my invention.

Fig. 2 is a similar view showing the mold closed.

Fig. 3 is a top plan view of a portion of the mold with the upper mold member broken away to show the finished belt.

Referring to the drawings, 10, 10 (Fig. 1) are rings of fibrous material and unvulcanized rubber, which may be formed in any known or suitable manner, but each of which preferably comprises, as here shown, an endless band of rubberized fabric rolled laterally upon itself. 10ª, 10ª (Figs. 2 and 3) are the finished belts or rings formed by the molding and vulcanizing of the rings 10.

The apparatus comprises a mold which, for illustration, I have here shown as consisting of three parts enclosing two annular molding cavities, although I do not wholly limit my claims to this dual type of mold. The preferred mold here shown comprises an annular female mold member 11 formed on its inner periphery with a pair of frusto-conical guiding or contact surfaces 12, 12, having their smaller ends adjacent, a narrow, annular plane surface or ledge 13 adjoining the outer end of each surface 12, an annular molding groove 14 adjoining each plane surface 13, a narrow annular plane surface or ledge 15 adjoining each groove 14, a narrow cylindrical surface 16 adjoining each surface 15, an outwardly flared frusto-conical surface 17 adjoining each surface 16, and a plane face 18 adjoining the surface 17. 19, 19 are male mold members adapted to be introduced to the female mold member 11 from opposite sides and to fit the latter, the cross-sectional contour of each, on its outer periphery, comprising, in order, a frusto-conical male surface 20 complementary to the surface 12 of the female mold member 11, an annular shoulder 21 abutting the plane surface 13, a molding groove 22 adapted to register with the groove 14 and therewith to enclose or define an annular mold cavity having the cross-sectional form desired in the finished article, a plane surface 23 abutting the surface 15, a cylindrical surface 24, fitting the surface 16, a frusto-conical surface 25 complementary to the surface 17, and a plane surface 26 abutting the plane face 18 of the female mold member 11. I prefer to make the male mold members 19 annular, as shown, for lightness and to avoid excessive dispersion of heat.

In the practice of my invention the belt or ring 10 is forced over the conical surface 20 of the male die member toward the groove 22 to stretch it circumferentially, and is further forced over the shoulder 21 into the groove 22, additionally stretching it. The ring may be either slid over the conical surface and lifted over the shoulder, as by the use of any convenient prying tool, an ordinary screw driver serving very well for this purpose, or it may be rolled over one or both, the preference depending in part upon the character of the belt.

A ring being thus mounted in the groove of each of the male mold members 19, they are assembled with the female mold member 11 as illustrated in Fig. 1.

The mold, with the two rings, 10, therein is then placed in a vulcanizing press (not shown), by which the mold is forcibly closed, as illustrated in Fig. 2, and the rings are thus molded and vulcanized to the desired cross-sectional form while they are held under circumferential tension in the grooves 22 of the male die members.

It will be observed that the parting plane of the molds at the outer periphery of the ring, represented by the contacting plane faces 15 and 23, is at an intermediate position on the outer face of the ring, and the pinching of the fabric is largely prevented by the circumferential tension of the ring holding it away from said surfaces, as the ring is molded, until the mold is almost closed.

Pinching of the fabric of the belt at its inner periphery between the plane contacting faces 13 and 21, is substantially prevented, in the instance of the V-shaped belt here shown, by the inclination of the adjacent wall of the groove 14 which tends to wedge the fabric away from said faces. I do not wholly limit my claims, however, to the specific cross-sectional contour of the mold-members here shown.

The molding fins or rands run in a longitudinal direction upon the ring, so that they do not interfere with the smooth running of the same when it is used as a belt. The inner rand, being at a corner, may readily be trimmed, and the outer rand, being at an intermediate position on the outer periphery of the ring, does not come in contact with the pulleys when the ring is used as a belt.

By first mounting the belt under tension upon a support, and then applying molding pressure in a direction perpendicular to its plane, the belt is molded to form, under circumferential tension, with a minimum movement of material during the closing of the mold, so that irregular distortion and pinching of the fabric is avoided.

I claim:

1. The method of making an endless belt or ring which comprises forming an annular structure of fibrous material and a vulcanizable plastic, forcing said structure over a tapered surface to stretch it, forcing it from said surface onto a molding surface, and molding and vulcanizing said structure in its stretched condition while supported upon said molding surface.

2. The method of making an endless belt or ring which comprises forming an annular structure of fibrous material and rubber, mounting said structure under circumferential tension upon a support, and molding said structure by applying molding pressure thereto in a direction substantially perpendicular to its plane.

3. A mold comprising two mold members defining an annular mold cavity, the lines of separation of the mold running longitudinally of said cavity, and one of said mold members being formed with a substantially cylindrical molding surface adapted to support a ring under circumferential tension.

4. In apparatus of the character described the combination of a mold member formed with a molding surface adapted alone to hold an annular article under circumferential tension, and means for applying molding pressure thereto in a direction substantially perpendicular to the plane of said annular article.

5. In apparatus of the character described, the combination of a mold member formed with an annular male surface adapted alone to hold a ring under tension, means for stretching a ring onto said surface, and a complementary mold member.

6. In apparatus of the character described the combination of a mold member formed with a molding surface adapted alone to support an annular structure under circumferential tension, a tapered member adjacent thereto adapted to stretch a ring as the latter is forced thereover, and means for applying molding pressure to said ring while it is held under tension upon said mold member.

7. A mold comprising two sections each formed with a continuous annular molding surface adapted alone to support a ring under tension, one of said sections being provided with a tapered annular male surface adjacent its molding surface and adapted to stretch a ring as the latter is forced thereover toward said molding surface.

8. In apparatus of the character described the combination of a mold member provided with a tapered portion and with an annular molding surface at the base of said portion, said molding surface being adapted alone to hold a ring under tension and a second mold member adapted to be presented to the first mold member by relative axial movement and with the first mold member to enclose an annular molding cavity.

9. A mold comprising two complementary mold sections formed with registerable annular grooves, means for guiding said sections together so that said grooves form a closed, annular molding cavity, the parting "plane" of said mold intersecting said molding cavity at an intermediate part of the outer periphery of the latter and having a conical form adjacent the inner periphery of said cavity.

10. A mold comprising an outer mold member formed with an annular groove on its inner periphery, an annular inner mold member formed with an annular molding surface on its outer periphery adapted to be closed upon the aforesaid groove and therewith to form an enclosed annular mold cavity, and an annular projection on said inner mold member concentric with said molding surface, said projection having a tapered outer surface distinct from its molding surface and adapted to stretch a ring as the latter is forced thereon.

11. In apparatus of the character described, the combination of a mold member formed with an annular molding surface adapted to hold a ring under tension, and a complementary mold member adapted with the first member to define an annular molding cavity having the cross-sectional form of a truncated V, said mold members parting on planes respectively intersecting said cavity at its outer periphery and at the inner end of one leg of the V.

12. In apparatus of the character described, the combination of a pair of male mold members each formed with a molding surface adapted to hold a ring under tension, and a female mold member adapted to receive one of said male mold members from each side and with each of the same to define an annular molding cavity.

13. In apparatus of the character described, the combination of a pair of male mold members each formed with a molding surface adapted to hold a ring under tension, means for stretching a ring onto each of said mold members, and a female mold member adapted to receive one of said male mold members from each side and therewith to define an annular molding cavity.

14. In apparatus of the character described, the combination of a pair of mold members each provided with a tapered male surface adapted to stretch a ring as the latter is forced thereover and with an annular molding surface around the base of said tapered surface, and a female mold member adapted to receive the mold members of said pair from opposite sides and with each to define an annular molding cavity.

In witness whereof I have hereunto set my hand this 9 day of December, 1921.

ALFRED E. MOON.